3,093,622
COPOLYMERS OF VINYLBENZYL ALCOHOL WITH VINYL COMPOUND

John G. Abramo and Earl C. Chapin, Springfield, Mass., assignors to Monsanto Chemical Company, St. Louis, Mo., a corporation of Delaware
No Drawing. Filed Mar. 25, 1960, Ser. No. 17,494
5 Claims. (Cl. 260—85.5)

The present invention relates to synthetic copolymer materials and more particularly to synthetic copolymers containing available hydroxyl groups.

Polymers including homopolymers, copolymers or interpolymers formed from amides, esters and nitriles of acrylic and methacrylic acids have found extensive use as coating compositions. Generally, while these polymers form good continuous films, are cohesive, nevertheless their adhesion to the surfaces of the various articles or substrates being coated leaves much to be desired.

Accordingly, it is a principle object of this invention to provide novel copolymers of amides, esters and nitriles of acrylic and methacrylic acids containing available hydroxyl groups, and which as a result can be cross-linked or cured to gain improved adhesion between themselves and surfaces of articles, substrates, etc., on which they are coated or applied.

Another object is to provide coatings, finishes, etc. exhibiting good adhesion to various support materials such as cellulosic materials, including paper, textiles and wood, protein materials including textiles such as wool, polyamides, etc., also ceramics, metals and other synthetic and natural polymeric materials.

Other objects of the invention will in part be obvious and will in part appear hereinafter.

These and other objects of the invention are obtained in synthetic copolymers obtained from interpolymerizing (a) vinylbenzyl alcohol with (b) vinyl monomeric components selected from the class consisting of amides, esters and nitriles of acrylic acid and methacrylic acid.

The following examples are given in illustration of the invention. Where parts are mentioned, parts by weight are intended unless otherwise described.

Example I

A solution constituted of 8 grams of acrylamide, 3 grams of p-vinylbenzyl alcohol, 10 grams of allyl alcohol and 0.5 ml. of di-tertiarybutyl peroxide is sealed in 8 mm. glass tubes under nitrogen and heated in an oil bath at 140° C. for three hours. A hard, light yellow polymer is obtained which is insoluble in the allyl alcohol solvent. The polymer is dissolved in hot formamide and precipitated from ethanol. Seven and one-half grams of a light tan powder are obtained which when analyzed is shown to contain 3.3% hydroxyl groups by weight.

Example II

A solution constituted of 8.0 grams acrylonitrile and 2.0 grams of p-vinylbenzyl alcohol is added to a warm solution of 0.2 gram of $K_2S_2O_8$ and 1 gram of triethanol amine in 50 ml. of water. Polymerization starts almost immediately and is essentially complete in one hour. The white flocculent precipitate is collected on a filter and washed with water and alcohol. The product on drying weighs 10 grams. On analysis the product is found to contain 20.5% nitrogen and 2.8% hydroxyl by weight. This corresponds to a polymer composition of 21.5% p-vinylbenzyl alcohol and 77.5% acrylonitrile. This polymer gives very viscous solutions in dimethyl formamide.

Example III

The procedure of Example II is again followed with the exception that p-isopropenylbenzyl alcohol is used in place of the p-vinylbenzyl alcohol of that example.

Example IV

A solution constituted of 8.0 grams of butyl methacrylate, 2.0 grams of p-vinylbenzyl alcohol, 10 grams of butylalcohol and 0.5 ml. of ditertiary butylperoxide is sealed in 8 mm. glass tubes under nitrogen and heated for 3 hours at 140° C. The resulting clear, colorless, viscous solution is added to hexane with the result that a colorless, tough polymer becomes precipitated. The product weighs 6.5 grams and contains 2.9% hydroxyl content by weight. This polymer is found to be soluble in xylene-butanol and other common solvents.

Example V

A solution containing 80% polymer from Example IV and 20% solids partial butyl ether of hexamethylol melamine modified with toluene sulfonamide in xylene-butanol is cast on a 10 mil. steel plate. After baking for 20 minutes at 160° C. a clear, colorless, very tough film is obtained which shows good adhesion to the metal. The film is not attacked by xylene-butanol mixtures.

The copolymers of the present invention are obtained from interpolymerization of vinylbenzyl alcohol with a vinyl monomeric component selected from the class consisting of amides, esters and nitriles of acrylic acids and methacrylic acids.

The vinylbenzyl alcohols which can be used as monomeric components include those having the structure:

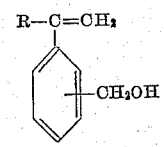

wherein R is selected from the class consisting of hydrogen and methyl radicals. More particularly, the subject alcohols include the o-vinylbenzyl alcohol, m-vinylbenzyl alcohol and the p-vinylbenzyl alcohol when R represents hydrogen; and when R represents a methyl radical the o-isopropenylbenzyl alcohol, m-isopropenylbenzyl alcohol and the p-isopropenylbenzyl alcohol are representative of the subject alcohols. Various simple substituents such as the halogens and alkyl radicals can also be accommodated on the phenyl radical, to provide alcohols intended to be included here. The subject vinylbenzyl alcohols can be produced in the manner set forth in copending application S.N. 747,828, filed July 11, 1958, now U.S. Patent No. 3,055,947 in the name of John G. Abramo. Mixtures of these alcohols can also be used.

The vinyl monomeric components which can be used can be visualized as having the structure:

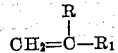

wherein R is selected from the class consisting of hydrogen and methyl radical and $R_1$ is selected from the class consisting of (a) carbamyl radical having the structure:

(b) carboalkyl radicals having the structure:

wherein $R_2$ is an alkyl radical and (c) a nitrile radical having the structure:

and mixtures of the same. The monomeric vinyl (vinyl is limited to acrylic and methacrylic radicals) amides are represented by acrylamide and methacrylamide. The monomeric vinyl (acrylic and methacrylic acid) esters are preferably those containing 1–8 carbon atoms in the longest continuous chain of the alcoholic moiety thereof. These include methyl acrylate, methyl methacrylate, ethyl methacrylate, n-propyl acrylate, n-propyl methacrylate, isopropyl acrylate, isopropyl methacrylate, n-butyl acrylate, n-butyl methacrylate, 2-ethylhexyl acrylate, etc. The monomeric vinyl (acrylic and methacrylic acid) nitriles are the acrylonitrile and methacrylonitrile.

Copolymers exhibiting the desired adhesive properties on being cross-linked are those which contain in copolymerized form 2 to 80% by weight of vinylbenzyl alcohol and 98 to 20% by weight of the acrylic or methacrylic monomeric component reflecting .25 to 10.0% hydroxyl content as determined by weight. A more preferred copolymer constituency range is 10 to 40% by weight of vinyl benzyl alcohol and 90 to 60% by weight of the acrylic or methacrylic monomer reflecting about 1.3 to 5.2% hydroxyl content.

The copolymers of the present invention can be prepared using mass, solution or emulsion polymerization techniques.

In the mass and solution polymerization, a monomeric mixture is prepared of from 2 to 80 parts by weight of vinylbenzyl alcohol and from 98 to 20 parts by weight of acrylic or methacrylic monomeric component, parts by weight being on the weight of the total monomers. The monomer mixture is subjected to heating at about 30 to 150° C. under at least autogenous pressure until the monomers become copolymerized or interpolymerized. Copolymerization can be thermally initiated but is preferred to employ a small quantity of a free radical polymerization initiator such as hydrogen peroxide, ditertiarybutyl peroxide, benzoyl peroxide, tertiary butyl perbenzoate, pinacolone peroxide, di-tertiarybutyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution-type of polymerization are organic liquids which are inert to the reaction, e.g., toluene, xylene, benzene, dioxane, etc.

In the emulsion polymerization, a monomeric mixture prepared as above, is continuously and slowly added to an excess of water maintained at a polymerization temperature of 30 to 150° C. and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferable, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal salts of long-chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer.

The synthetic copolymers of the present invention are clear and substantially devoid of color. They can be used as linear copolymers, in the form obtained from any of the mass, solution or emulsion processes described above to provide a variety of coating and finishing applications. Because they are soluble in a variety of common organic solvents such as butanol, xylene, etc. they can be solvated and applied as such to the surfaces on which they are to provide protective coatings or finishes. Of greater interest, however, and due to the presence of available hydroxyl groups on the backbone of the copolymers of the present invention, they can be compounded with other resinous materials such as melamine-formaldehyde and urea-formaldehyde condensates, alkyd resins as well as other curing agents such as diisocyanates di-acid chlorides, etc. Then after being so compounded and when solvated and then deposited on surfaces and substrates which they are designed to provide with a protective coating or finish, they can be exposed to elevated temperatures causing them to become cured or cross-linked with the previously available hydroxyl groups acting as sites for this secondary reaction. In the cross-linked form which then results, the copolymers of the present invention retain their cohesive properties, form continuous films, coatings or finishes while nonetheless evidencing advanced properties, of adhesion together with resistance to the usual organic solvents, etc.

The copolymers of the present invention can also be compounded with various fillers and adjuncts such as colorants, plasticizers, etc.

It will thus be seen that the objects set forth above among those made apparent from the preceding description are efficiently attained and since certain changes can be made in carrying out the above process and in the polymer products which result without departing from the scope of the invention, it is intended that all matter contained in the above description shall be interpreted as illustrative and not in a limiting sense.

What is claimed is:

1. Synthetic copolymers having on the weight of said copolymer in polymerized form (*a*) from 2 to 80% by weight of a vinylbenzyl alcohol having the structure:

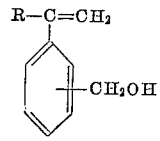

wherein R is selected from the class consisting of hydrogen and methyl radical, and (*b*) correspondingly, from 98 to 20% by weight of a vinyl component having the structure:

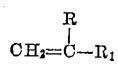

wherein R is selected from the class consisting of hydrogen and methyl radical and $R_1$ is selected from the class consisting of carbamyl radical having the structure:

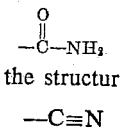

nitrile radical having the structure:

$$-C\equiv N$$

and carboalkyl radicals having the structure:

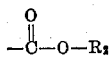

wherein $R_2$ is an alkyl radical of from 1 to 8 carbon atoms; the combined proportions of components (a) and (b) totaling 100% by weight of the synthetic copolymer.

2. The synthetic copolymer according to claim 1 wherein the vinylbenzyl alcohol is p-vinylbenzyl alcohol and the vinyl component is acrylamide.

3. The synthetic copolymer according to claim 1 wherein the vinylbenzyl alcohol is p-vinylbenzyl alcohol and the vinyl component is acrylonitrile.

4. The synthetic copolymer according to claim 1 wherein the vinylbenzyl alcohol is p-vinylbenzyl alcohol and the vinyl component is n-butyl methacrylate.

5. The synthetic copolymer according to claim 1 wherein the vinylbenzyl alcohol is p-isopropenylbenzyl alcohol and the vinyl component is acrylonitrile.

References Cited in the file of this patent

UNITED STATES PATENTS 2,531,355  Emerson _____ Nov. 21, 1950

FOREIGN PATENTS 691,038  Great Britain _____ May 6, 1953